UNITED STATES PATENT OFFICE 2,595,198

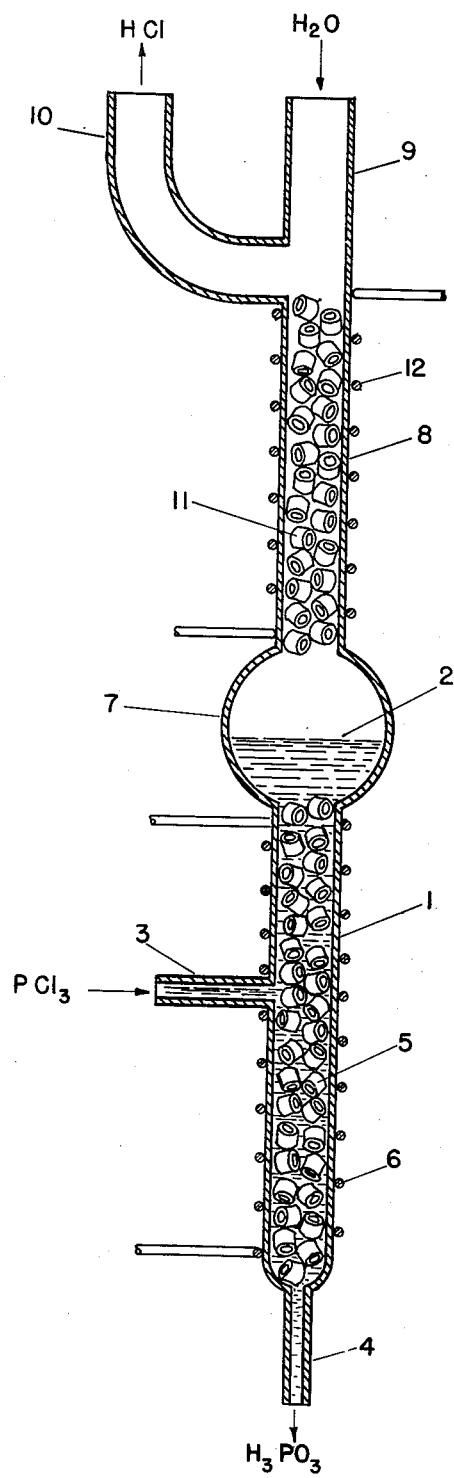

METHOD OF PREPARING PHOSPHOROUS ACID

John W. Lefforge and Robert B. Hudson, Anniston, Ala., assignors to Monsanto Chemical Company, St. Louis, Mo., a corporation of Delaware Application September 25, 1948, Serial No. 51,194

9 Claims. (Cl. 23—165)

The present invention relates to phosphorous acid, salts thereof and to a novel method of manufacturing same.

One object of the invention is to provide an economically and commercially feasible method of producing phosphorous acid and the alkali metal salts thereof.

Another object of the invention is to provide a continuous method of producing the foregoing products.

An additional object is to provide a direct method of producing highly concentrated phosphorous acid by hydrolysis of phosphorus trichloride in which excessive losses of the latter by volatilization are obviated.

A further object is to provide a method of producing phosphorous acid by hydrolysis of phosphorus trichloride in which substantial decomposition of the reactants and/or product into undesired products is avoided.

A still further object is to provide a method of producing phosphorous acid by hydrolysis of phosphorus trichloride wherein a product is obtained which is free or substantially free of hydrogen chloride.

It is also an object of the instant invention to provide a new salt of phosphorous acid, namely hemisodium phosphite: $NaH_2PO_3.H_3PO_3$.

Other objects and advantages of the invention will be obvious to those skilled in the art as the description proceeds.

Heretofore, several methods of hydrolyzing phosphorus trichloride to form phosphorous acid have been employed and while they have been satisfactory for laboratory use, they have not been adopted, so far as we are aware, on a commercial scale.

For example, it is known that phosphorous acid may be prepared by reacting together at low temperatures stoichiometric amounts of phosphorus trichloride and water, but as previously practiced, this method results in substantial decomposition of the desired product and/or excessive loss of phosphorus trichloride by volatilization.

As a means of overcoming these disadvantages, it has been proposed to moderate the reaction by the combined use of low temperatures and a large excess of water. This technique results in the substantial elimination of side reactions, excessive decomposition and loss of phosphorus trichloride, but the use of a large excess of water yields dilute phosphorous acid which must be concentrated if such a product is desired.

As a further modification of the above method, cold concentrated hydrochloric acid has been used to moderate the hydrolysis reaction and at the same time avoid excessive dilution of the product, but the phosphorus trichloride losses are still so excessive as to render the method commercially unattractive.

Thus, according to the prior art, low temperatures and concentrated hydrochloric acid are essential to the production of concentrated phosphorous acid with a minimum loss of phosphorus trichloride by volatilization and/or loss of product by decomposition. However, contrary to this conception, we have made the surprising discovery that the above objectives can be attained by reacting phosphorus trichloride with water or phosphorous acid at relatively high temperatures, that is, at temperatures equivalent to or above the boiling point of the trichloride. Moreover, we have discovered that contrary to expectations, phosphorus trichloride hydrolyzes readily in concentrated phosphorous acid and that the latter may be used as a hydrolyzing medium to directly produce more highly concentrated acid without the necessity of resorting to separate concentrating operations.

Stated in its broadest aspect, the present invention comprises reacting phosphorous trichloride with water or phosphorous acid at a temperature equivalent to or above the boiling point of phosphorus trichloride, but below that temperature at which substantial decomposition of the trichloride into products other than phosphorous acid takes place.

More specifically, the invention is concerned with a method of directly producing practically 100% phosphorous acid without substantial loss of $PCl_3$, which method involves hydrolyzing the above trichloride in a phosphorous acid solution of at least 80% strength and at a temperature within the above range.

Still more specifically, the invention comprises producing phosphorous acid by hydrolyzing phosphorus trichloride under the above conditions, and in a system wherein the reactants continuously flow countercurrently to each other.

Expressed in a still more limited form, the invention comprises producing phosphorous acid by introducing phosphorus trichloride into a suitable tower containing a heel of phosphorous acid of about 85% to 95% strength under conditions insuring at least 66% hydrolysis in the heel, passing the volatilized $PCl_3$-HCl mixture up through the tower countercurrently to a stream of water or aqueous phosphorous acid to hydrolyze the unreacted $PCl_3$, withdrawing the crude concentrated phosphorous acid from the "heel," as rapidly as it is formed in the tower, dechlorinating and then neutralizing the resulting product.

The hydrolysis of phosphorus trichloride to phosphorous acid may be carried in systems of various types.

For example, the hydrolysis reaction may be effected in a continuous manner by passing phosphorus trichloride into the bottom of a spray-packed- or bubble-cap-tower countercurrently to the flow of water or phosphorous acid. In such a system, the product is continuously withdrawn from the bottom of the tower and the hydrogen chloride produced as a by-product is continuously exhausted from the top thereof. This system may be modified by providing means for recycling the phosphorous acid to the top of the tower where it may be reintroduced, with or without the addition of water, for further reaction with phosphorus trichloride. The phosphorous acid thus obtained is repeatedly recycled in whole or in part until the desired concentration is obtained.

The reaction may also be executed in a cascade system of relatively small reactors wherein the phosphorus trichloride flows from one to the other until completely reacted and the reaction liquors of successively lower concentrations of $H_3PO_3$ are conveyed in a countercurrent direction from one reactor to the other until the phosphorous acid is concentrated to the desired degree.

Another system in which the hydrolysis may be carried out is one including a series of small reactors in which the reaction liquors are successively pumped from one to the other in a direction countercurrently to the flow of phosphorus trichloride.

A further system which may be employed is one wherein a substantial part of the hydrolysis takes place in a liquid reaction zone and the unreacted phosphorus trichloride is then removed from the volatilized $HCl-PCl_3$ mixture by scrubbing with water or phosphorous acid in a separate vapor reaction zone.

The preferred system, however, is one involving the use of a packed tower containing a "heel" of phosphorous acid. In accordance therewith, phosphorus trichloride is introduced into the "heel" under conditions resulting in hydrolysis of at least 66% of the trichloride and the remaining unreacted $PCl_3$ volatilized with the hydrogen chloride produced is passed up into a vapor section where it meets a descending stream of water or phosphorous acid and is substantially completely converted to phosphorous acid. The undissolved hydrogen chloride and traces of phosphorus trichloride pass out of the top of the column and the phosphorous acid formed flows into the heel, from which product is discharged as rapidly as it is produced in the tower. This system has the advantage over those described above in that smaller and/or much less equipment is required for large volume production.

The foregoing systems are merely illustrative of those which may be used in practicing the hereindescribed method of making phosphorous acid, and it is to be understood that the invention is not restricted thereto as any gas and liquid contact system may be employed which provides a sojourn time, at the selected operating temperature and feed rates, of sufficient duration to effect substantially complete hydrolysis of the phosphorus trichloride charged.

For a more complete understanding of the present invention, reference is made to the accompanying drawing which forms a part of this specification. This drawing shows a vertical cross sectional view of a suitable reactor for practicing the instant method, it being understood that the invention is not restricted thereto.

Reference character 1 represents the bottom or liquid section of the reactor in which a "heel" of phosphorous acid is introduced up to the level 2 indicated in the drawing. This section is provided with a $PCl_3$-inlet tube 3, an $H_3PO_3$ discharge tube 4, packing rings 5 of glass, porcelain and the like and an electrical winding 6 for heating the liquid section to the desired temperature. An equilibrium, the zone below the $PCl_3$ inlet tube becomes highly supersaturated with HCl and serves as a dechlorination section, heat being applied thereto by coil 6 to facilitate the liberation of HCl.

The center or surge bulb section of the reactor is represented by reference character 7, which section is provided to facilitate maintaining the liquid at a constant level throughout the reaction.

The upper or vapor section is represented by reference character 8. This section is equipped with a water inlet tube 9, and HCl discharge tube 10, glass or porcelain rings 11 and a suitable heating coil 12.

In the practice of the present invention, liquid phosphorus trichloride is charged to the reactor at a rate designed to hydrolyze at least 66% of the trichloride in the liquid section, the remainder being volatilized with the liberated hydrogen chloride. The resulting gaseous mixture passes up through the vapor section where it is scrubbed by a descending stream of dilute phosphorous acid. The enriched scrubbing liquid continuously replenishes the heel in the liquid section from which the product is continuously discharged by way of outlet tube 4. The water used to produce the dilute phosphorous acid scrubbing liquid is continuously supplied in substantially stoichiometric proportions at the top of the vapor section by inlet 9, and the liberated HCl discharged therefrom by way of outlet tube 10.

The following example illustrates in greater detail the method of practicing the invention in the above apparatus:

*Example I*

Phosphorus trichloride was continuously charged over a period of one hour and twenty minutes into a heel of 300 grams of approximately 89.6% $H_3PO_3$ at a rate of about 26.31 grams per minute. Simultaneously therewith, water was continuously and countercurrently charged to the vapor section in substantially the theoretical proportions required to react with the $PCl_3$ charged. The unreacted $PCl_3$ in the liquid section was continuously volatilized into the vapor section along with the liberated HCl, where it was converted into additional quantities of HCl and phosphorous acid by reaction with the descending stream of water (or dilute phosphorous acid).

The phosphorous acid produced in the vapor section entered the liquid section and continuously replenished the phosphorous acid heel, from which 99.4% $H_3PO_3$ was continuously discharged from the system by pipe 4. The hydrogen chloride liberated as a result of the hydrolysis reaction passed up through the vapor section together with small amounts of water vapor, and the resulting mixture was continuously discharged from the system by way of outlet tube 10.

During the reaction, the temperatures in the liquid and vapor sections were controlled so that the vaporous mixture leaving the vapor section was at a temperature of about 95° C. while the product leaving the liquid section was at a temperature of about 104° C. to 113° C.

The temperature of the reactor at the point of $PCl_3$ introduction varied from 68° C. to 95° C., but within about 5 minutes after initiation of the reaction, the temperature was maintained at a value equivalent to or above the boiling point (76° C.) of phosphorus trichloride and during the greater part of the reaction time, the temperature was held within the range of about 86° C. to 90° C.

Approximately 83% to 87% of the phosphorus trichloride charged to the reactor was hydrolyzed in the liquid section and except for about 0.52% to 0.75% which was lost and unaccounted for, the remaining $PCl_3$ was hydrolyzed in the vapor section. The overall product yield in the two sections was about 99.5% of theory.

The phosphorous acid produced by the above described method usually contains from about 1% to about 5% by weight of HCl and it is desirable to remove this impurity prior to storage or prior to converting the acid to the corresponding alkaline salts. This is accomplished by heating the crude phosphorous acid to a temperature of 100° C. to 150° C. while under a vacuum of approximately 30 mm. of mercury, but it is preferably achieved by passing air or another suitable inert gas therethrough for a period of about 30 minutes while heating same to a temperature of about 150° C. These dechlorination methods are merely illustrative of techniques which may be employed, and it is to be understood that any other HCl removal method which does not adversely affect the phosphorous acid product is within the scope of the invention.

After removal of the above impurity, the phosphorous acid may be neutralized with various alkaline materials to form the corresponding salts.

For example, the essentially anhydrous salts of phosphorous acid: $NaH_2PO_3$, $Na_2HPO_3$ and $NaH_2PO_3.H_3PO_3$ are prepared by reacting together substantially stoichiometric proportions of molten or solid $H_3PO_3$ and sodium hydroxide. The products of this reaction are free flowing crystalline white powders.

The hydrated salts: $Na_2HPO_3.5H_2O$ and $NaH_2PO_3.2.5H_2O$ are prepared by carrying out the reaction in the foregoing manner and then crystallizing the reaction product from aqueous solution at temperatures below 100° C. and 40° C. respectively.

The hemisodium phosphite ($NaH_2PO_3.H_3PO_3$) referred to above may also be prepared in the following manner:

16.3 grams of sodium hydroxide melted up in 10 milliliters of water was added dropwise to 25 milliliters of 84.8% $H_3PO_3$, whereupon 20 milliliters of the resulting solution was concentrated at reduced pressure and cooled. To the cooled concentrated solution, 20 milliliters of 84.8% $H_3PO_3$ was introduced and the resulting solution cooled to about 30° C. The crystalline product thus obtained was filtered from its mother liquor and then washed with methanol.

10 milliliters of 84.8% $H_3PO_3$ was added to the separated mother liquor and the temperature rose from 32° C. to 35° C. A second crop of crystals was obtained and treated in the manner described above.

To the remaining mother liquor, an additional 10 milliliters of 84.8% $H_3PO_3$ was added and a third crop of crystals produced. This product was separated by filtration and then washed with methanol.

On analysis, the crystalline products obtained in the above manner were found to have the following composition:

|  | $H_3PO_3$ | $Na_2O$ | $P_2O_5$ | Cl |
| --- | --- | --- | --- | --- |
|  | Per cent | Per cent | Per cent | Per cent |
| Theory | 88.1 | 16.67 | 76.3 | 0 |
| Found | 87.8 | 16.78 | 74.3 | 0.58 |

The above composition corresponds to hemisodium phosphite, $NaH_2PO_3.H_3PO_3$, which according to X-ray analysis, is a new compound and not merely a mechanical mixture of $NaH_2PO_3$ and $H_3PO_3$. The novelty of this compound is further confirmed by the fact that it has properties which differ from the known sodium salts of phosphorous acid. As evidence of this fact, reference is made to the following table which lists the above salts and their properties:

| Compound | $H_3PO_3$ Per Cent | Heat Stability |
| --- | --- | --- |
| $NaH_2PO_3$ | 78.8 | Decomposes, 150–250° C. |
| $NaH_2PO_3.2.5H_2O$ | 54.6 | Melts at 45° C. |
| $2NaH_2PO_3.H_3PO_3.0.5H_2O$ | 82.3 | Loses $H_2O$, 200° C. |
| $NaH_2PO_3.H_3PO_3$ | 88.1 | Melts at 156° C. |
| $Na_2HPO_3$ | 65.1 | Decomposes, 130° C. |
| $Na_2HPO_3.5H_2O$ |  | Loses $H_2O$, 100° C. |

In addition to the above differences, hemisodium phosphite is much more stable and less hygroscopic than phosphorous acid and the other sodium phosphite salts mentioned above.

Hemisodium phosphite is a crystalline essentially non-hygroscopic solid which melts at about 156° C. Water solutions of this salt are strongly acid (1% solution: pH 1.8) and have the reducing properties of phosphorous acid. It contains the equivalent of 88% $H_3PO_3$ and may be used as a substitute for concentrated phosphorous acid which is hygroscopic and inconvenient to handle. It may also be used as a leavening acid.

The dechlorinating and neutralization steps have been described above as batch operations but, if desired, the phosphorous acid which is continuously produced in the above described manner may be discharged from the reactor and successively led to dechlorinating and neutralizing tanks, where it is continuously subjected to dechlorination and neutralization by one of the procedures hereinbefore described.

For example, the hydrated sodium phosphites and hemisodium phosphite may be advantageously produced in a continuous manner by continuously reacting dechlorinated phosphorous acid with aqueous sodium hydroxide, suitably cooling the resulting solution to form a slurry of the desired product and then recovering the crystalline product by centrifuging, filtering or in any other suitable manner.

The various conditions of operation will now be discussed in detail.

In the production of phosphorous acid in accordance with the present invention, the hydrolysis reaction is carried out at a temperature at least equivalent to or above the boiling point of phosphorus trichloride, but below the temperature at which substantial decomposition of the trichloride into products other than phosphorous acid occurs. More particularly, the reaction is executed at a temperature substantially in the range of about 76° C. up to about 200° C., the upper limit varying with the concentrations of the reactants.

In the manufacture of phosphorous acid by the preferred procedure, that is, in a packed tower or equivalent apparatus utilizing a heel of phosphorous acid, the reaction in the liquid section is effected at a temperature of from 76° C. up to about 200° C. or preferably 140° C. while the temperature in the vapor section is maintained within the range of 100° C. to about 200° C. Using these operating conditions and substantially stoichiometric amounts of water, it is desirable to supply phosphorus trichloride to the heel at a rate of about 30 to 35 grams per minute. However, the invention is not limited thereto as the $PCl_3$ feed rate may vary widely so long as about 66% to about 90% and preferably 70% to 80% of the trichloride is hydrolyzed in the liquid section of the tower. Stated in a different manner, it is essential that the $PCl_3$ feed rate be controlled so that $PCl_3$ entering the vapor section does not exceed about 34% of the trichloride charged, otherwise excessive losses thereof by volatilization and decomposition into undesired products will result.

As to the phosphorous acid in the heel or liquid section, it is desirable to limit its concentration to the range of 80% to 98% acid and within this range about 90% to 95% acid is preferred. However, phosphorous acid of lower or higher concentrations may be used if desired, but in no case should the phosphorous acid be of less than 50% strength.

The crude phosphorous acid produced by the method of the instant invention contains about 1% to about 5% by weight of HCl depending upon the $H_3PO_3$ concentration, temperature and sojourn time. This impurity should be removed, otherwise the acid will slowly decompose on storage, and upon neutralization with alkaline materials, the alkaline phosphites produced will be contaminated with the corresponding chlorides.

The removal of the above impurities may be achieved by heating under a vacuum or, more easily, by aeration or treatment with an inert gas.

For example, substantially complete removal of the HCl is effected by heating the crude acid to a temperature of from 100° C. to 150° C. while under an absolute pressure of approximately 30 mm. of mercury. This may also be achieved by aeration of the crude acid for 30 to 60 minutes at a temperature of from 75° C. to 150° C. with 30 volumes of air per volume of phosphorous acid. Thus, by using the latter method on crude 95% phosphorous acid containing about 2.5% HCl, this impurity may be reduced to a value of less than 0.01%.

In the production of sodium phosphites, phosphorous acid and alkaline compounds are reacted together in substantially the proportions theoretically required to produce the desired product. If the anhydrous salts are to be prepared, the reaction is carried out by reacting alkaline materials such as sodium hydroxide, potassium hydroxide, etc. with phosphorous acid in the solid or molten state. They may also be prepared by producing the hydrated salts and then converting the latter to the anhydrous form by heating or extraction with suitable solvents. The hydrated salts are produced by effecting the reaction in an aqueous medium followed by crystallization or by dissolving the anhydrous salts in water and then crystallizing at suitable temperatures.

The new salt, anhydrous hemisodium phosphite, may be prepared by any of the foregoing methods, but since it crystallizes from solution as an anhydrous salt, it is preferred to carry out the reaction in an aqueous medium and then recover the resulting product by cooling and centrifuging the crystalline slurry.

Where reference is made in the instant specification to phosphorus trichloride and hydrogen chloride (HCl), it is to be understood that the corresponding bromine compounds are also contemplated.

Reference is hereby made to application Serial No. 220,583 filed April 12, 1951, which is a division of the present application.

While the invention has been described with particular reference to specific embodiments, it is to be understood that it is not to be limited thereto, but is to be construed broadly and restricted solely by the scope of the appended claims.

We claim:
1. The method of continuously producing phosphorous acid, which comprises continuously supplying phosphorus trichloride and water, countercurrently to and in contact with each other, to a column reactor containing a vapor section and a liquid section consisting of a heel of at least 50% phosphorous acid and thereby continuously effecting substantially complete hydrolysis of said trichloride to phosphorous acid, and continuously withdrawing said phosphorous acid from said reactor, said reaction being carried out at a temperature at least equivalent to the boiling point of phosphorus trichloride but below that temperature at which substantial decomposition of said trichloride into products other than phosphorous acid takes place, and said phosphorus trichloride being supplied to said reactor by way of said liquid section at a rate so correlated with the temperature and concentration of the phosphorous acid therein as to effect continuous hydrolysis in the liquid section of at least 66% but substantially less than 100% of the trichloride supplied thereto.

2. The method of continuously producing phosphorous acid, which comprises supplying phosphorus trichloride and water, countercurrently to and in contact with each other, to a column reactor containing a vapor section and a liquid section consisting of a heel of at least 50% phosphorous acid and thereby continuously effecting substantially complete hydrolysis of said trichloride to phosphorous acid, and continuously withdrawing said phosphorous acid from said reactor, said reaction being carried out at a temperature at least equivalent to the boiling point of phosphorus trichloride but below that temperature at which substantial decomposition of said trichloride into products other than phosphorous acid takes place, and said trichloride being supplied to said reactor by way of said liquid section at a rate so correlated with the temperature and concentration of the phosphorous acid therein as to effect continuous hydrolysis in the liquid section of from 66% to 90% of the phosphorus trichloride supplied thereto.

3. The method of continuously producing phosphorous acid, which comprises continuously supplying phosphorus trichloride and water, countercurrently to and in contact with each other, to a column reactor containing a vapor section and a liquid section consisting of a heel of 80% to 98% phosphorous acid and thereby continuously effecting substantially complete hydrolysis of said trichloride to phosphorous acid, and continuously withdrawing said phosphorous acid from said reactor, said reaction being carried out at a temperature within the range of 76° C. to 140° C., and said phosphorus trichloride being supplied to said reactor by way of said liquid section at a rate so correlated with the temperature and concentration of the acid therein as to effect continuous hydrolysis in the liquid section of at least 66% but substantially less than 100% of the trichloride supplied thereto.

4. The method of continuously producing phosphorous acid, which comprises continuously supplying phosphorus trichloride and water, countercurrent to and in contact with each other, to a column reactor containing a vapor section and a liquid section consisting of a heel of 90% to 95% phosphorous acid and thereby continuously effecting substantially complete hydrolysis of said trichloride to phosphorous acid, and continuously withdrawing said phosphorous acid from said reactor, said reaction being carried out at a temperature within the range of 76° C. to 140° C., and said phosphorus trichloride being supplied to said reactor by way of said liquid section at a rate so correlated with the temperature and concentration of the acid therein as to effect continuous hydrolysis in the liquid section of at least 66% but substantially less than 100% of the trichloride supplied thereto.

5. The method of producing phosphorous acid, which comprises continuously introducing phosphorus trichloride into a heel of at least 50% phosphorous acid at a rate effecting hydrolysis of at least 66% but substantially less than 100% of said trichloride into liquid phosphorous acid and a volatilized product including unreacted phosphorus trichloride and hydrogen chloride, continuously contacting said volatilized product with water to substantially completely hydrolyze said unreacted phosphorus trichloride to phosphorous acid and continuously recovering said phosphorous acid, said hydrolysis reactions being carried out at a temperature at least equal to the boiling point of said phosphorus trichloride but below that temperature at which substantial decomposition of said phosphorus trichloride into products other than phosphorous acid takes place.

6. The method defined in claim 5 wherein the water is fed countercurrently to the volatilized product.

7. The method of producing phosphorous acid, which comprises continuously introducing phosphorus trichloride into a heel of from about 80% to about 98% phosphorous acid at a rate effecting hydrolysis of from about 70% to about 80% of said trichloride into liquid phosphorous acid and a volatilized product including unreacted phosphorus trichloride and hydrogen chloride, continuously contacting said volatilized product with water to substantially completely hydrolyze said unreacted phosphorus trichloride to phosphorous acid and continuously recovering said phosphorous acid, said hydrolysis reactions being carried out at a temperature of from 76° C. to about 200° C.

8. The method of producing phosphorous acid, which comprises continuously introducing phosphorus trichloride into a heel of from about 85% to about 95% phosphorous acid at a rate effecting hydrolysis of from about 70% to about 80% of said trichloride into liquid phosphorous acid and a volatilized product including unreacted phosphorus trichloride and hydrogen chloride, continuously contacting said volatilized product with water to substantially completely hydrolyze said unreacted phosphorus trichloride to phosphorous acid and continuously recovering said phosphorous acid, said hydrolysis reactions being carried out at a temperature of from 76° C. to about 140° C.

9. The method of producing phosphorous acid, which comprises continuously introducing phosphorus trichloride into a heel of about 90% phosphorous acid at a rate effecting hydrolysis of from about 83% to about 87% of said trichloride into liquid phosphorous acid and a volatilized product including unreacted phosphorus trichloride and hydrogen chloride, continuously contacting said volatilized product with water to substantially completely hydrolyze said unreacted phosphorus trichloride to phosphorous acid and continuously recovering said phosphorous acid, said hydrolysis reactions being carried out at a temperature of from 76° C. to about 90° C.

JOHN W. LEFFORGE.
ROBERT B. HUDSON.

REFERENCES CITED

The following references are of record in the file of this patent:

UNITED STATES PATENTS

| Number | Name | Date |
|---|---|---|
| 1,680,625 | Lang | Aug. 14, 1928 |
| 1,888,713 | Britton et al. | Nov. 22, 1932 |
| 2,031,827 | Fiske et al. | Feb. 25, 1936 |
| 2,081,322 | Carney | Mar. 25, 1937 |
| 2,232,674 | Pyzel | Feb. 18, 1941 |
| 2,247,373 | Hartford et al. | July 1, 1941 |

OTHER REFERENCES

Mellor—Comprehensive Treatise on Theoretical and Inorganic Chemistry, vol. 8 (1928), Longmans, Green & Co., N. Y., pages 900–902, 911, 914.